Nov. 26, 1940. S. VAN MIERLO 2,223,082
HIGH FREQUENCY TRANSMISSION SYSTEM
Filed May 13, 1937 3 Sheets-Sheet 1
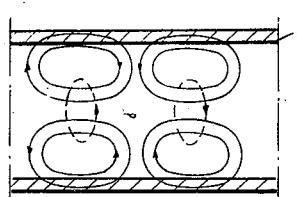 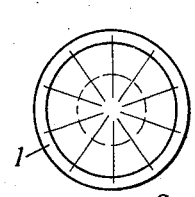 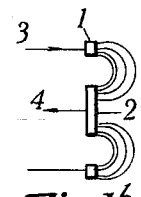 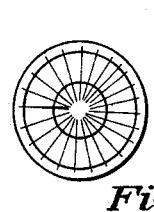
Fig. 1.    Fig. 1ᵃ    Fig. 1ᵇ    Fig. 1ᶜ
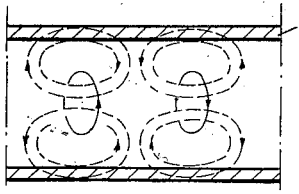 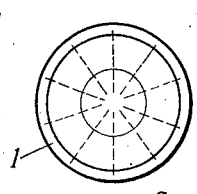 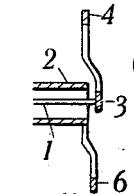 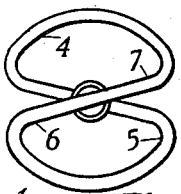
Fig. 2.    Fig. 2ᵃ    Fig. 2ᵇ    Fig. 2ᶜ
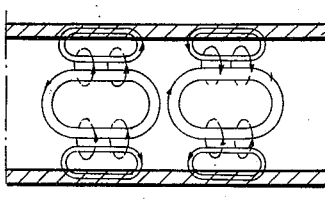 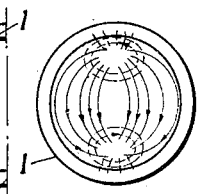 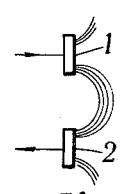 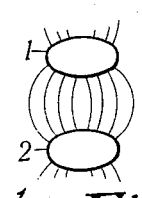
Fig. 3.    Fig. 3ᵃ    Fig. 3ᵇ    Fig. 3ᶜ
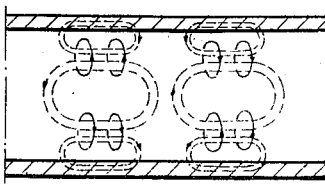 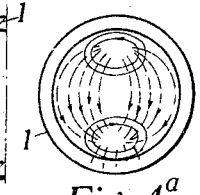 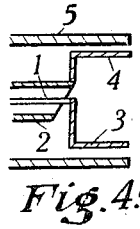 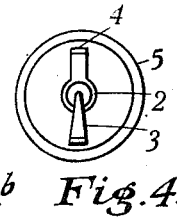
Fig. 4.    Fig. 4ᵃ    Fig. 4ᵇ    Fig. 4ᶜ
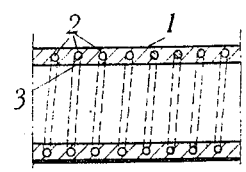 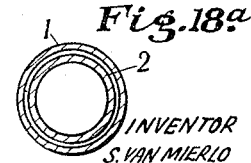
Fig. 18.    Fig. 18ᵃ
INVENTOR
S. VAN MIERLO
BY
ATTORNEY

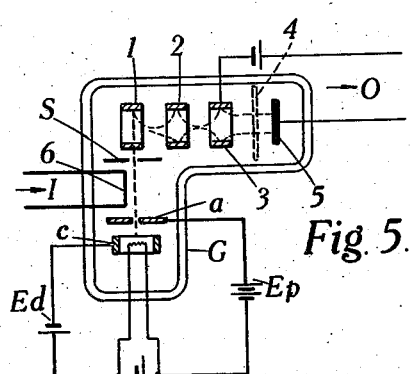
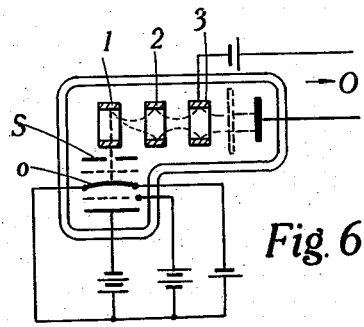
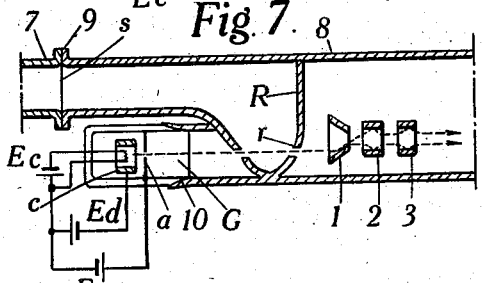
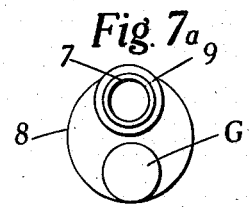
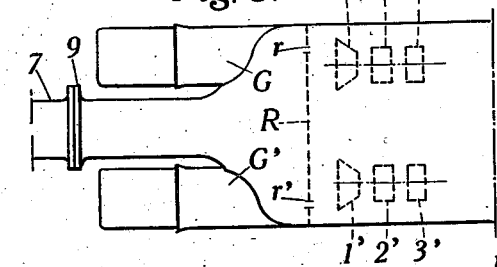
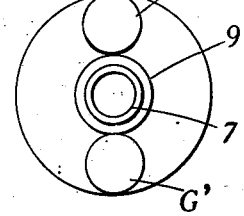
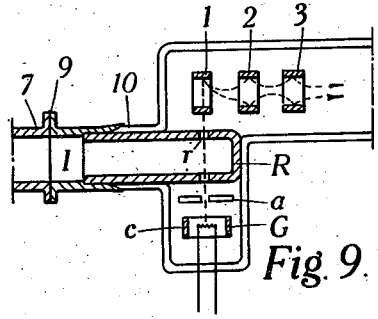
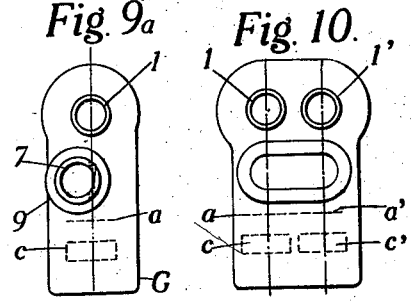

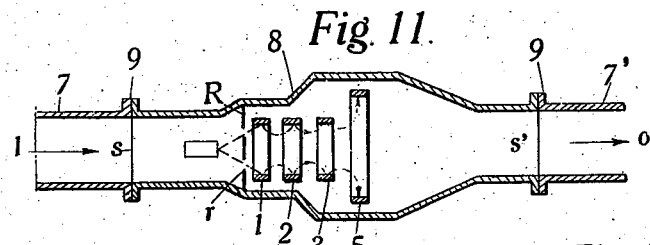
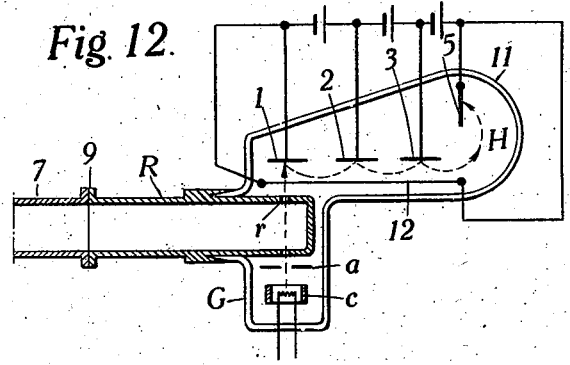
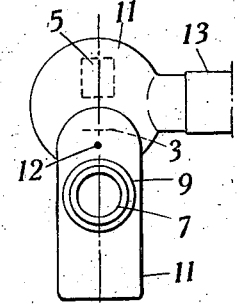
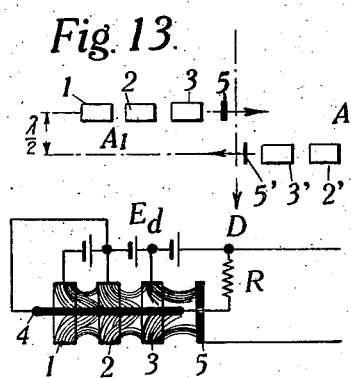
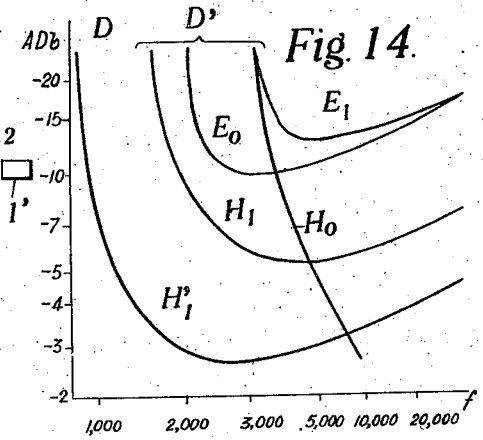
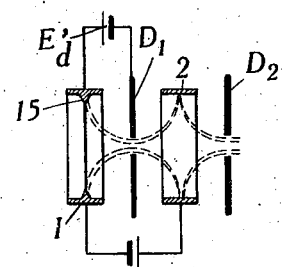
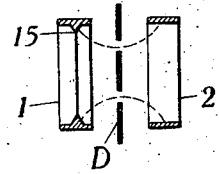

Patented Nov. 26, 1940

2,223,082

UNITED STATES PATENT OFFICE 2,223,082

HIGH FREQUENCY TRANSMISSION SYSTEM

Stanislas Van Mierlo, Paris, France, assignor to International Standard Electric Corporation, New York, N. Y.

Application May 13, 1937, Serial No. 142,432
In France May 19, 1936

8 Claims. (Cl. 178—44)

The present invention relates to improvements in ultra-high frequency transmission systems.

The present invention particularly relates to improvements on those systems of this kind employing dielectric guides.

Such transmission systems are in particular applicable to the transmission of messages. At these ultra-high frequencies it is easy to transmit a considerable number of messages on the same guide channel.

The transmission at such ultra-high frequencies can either be accomplished by means derived from optical transmission means (reflection devices, refraction devices, etc.) or by means of dielectric guides consisting for example of a metal tube containing a dielectric, for example, of air.

One object of the present invention is to provide transmission systems employing such dielectric guides, in particular guides with an air dielectric, with suitable devices for emission, reception and amplification.

One object of the invention is in particular to provide devices for the generation of ultra-high frequency waves of relatively high power.

A feature of the invention consists in the application in such systems of devices employing secondary emission such as electron multipliers.

Another feature of the invention consists in arrangements of ultra-high frequency transmission lines employing dielectric guides of relatively small diameter and relatively low attenuation.

Another feature consists in arrangements of ultra-high frequency transmission lines employing very small transmission levels, the parasitic noises being considerably reduced, certain of them even being eliminated.

Another feature consists in repeater arrangements permitting the control of the electrons directly by incoming waves and the production of outgoing waves directly by the movements of electrons.

The invention will further be clearly understood by means of the following description based on the attached drawings in which:

Figs. 1 and 1ª, 2 and 2ª, 3 and 3ª, 4 and 4ª show different types of electric or magnetic waves propagating inside a dielectric guide;

Figs. 1b 1c, 2b 2c, 3b 3c, 4b 4c represent sectional and plan views respectively of arrangements of electrodes intended to transmit or to receive the corresponding waves to Figs. 1–4;

Fig. 5 shows an embodiment of an amplifier device employing features of the invention;

Fig. 6 represents another embodiment of an amplifier employing an oscillator of the Barkhausen or Clavier type;

Figs. 7 and 7ª show in longitudinal and transverse sections a device in which the amplifier is directly controlled by incoming electric waves of the types shown in Figs. 1 and 3;

Figs. 8 and 8ª show in longitudinal and transverse sections a double arrangement of that shown in Figs. 7 and 7ª;

Figs. 9 and 9ª show an embodiment in which the amplifier is directly controlled by incoming magnetic waves of the types shown in Figs. 2 and 4;

Fig. 10 shows the corresponding embodiment of the device of Fig. 9 in the case of a double arrangement;

Fig. 11 shows an embodiment of a device in which electric waves of the type shown in Fig. 1 can be directly obtained from an electron multiplier;

Fig. 12 and 12ª represent in longitudinal and transverse sections respectively, an embodiment adapted to obtain magnetic waves of the type shown in Fig. 2;

Fig. 13 shows an arrangement of two electron multipliers associated in the manner indicated in order to produce directly magnetic waves of the type shown in Fig. 2;

Fig. 14 shows attenuation-frequency curves, which will be employed to explain certain features of the transmission considered;

Fig. 15 shows an embodiment of an electron multiplier particularly adapted to generate waves of the type shown in Fig. 1;

Fig. 16 shows an embodiment of a multiplier device which tends to preserve the grouping of the electrons;

Fig. 17 shows an example of an electron multiplier similar to that of Fig. 16 but employing a circular diaphragm; and, Figs. 18 and 18ª show in transverse and longitudinal sections respectively an arrangement of a dielectric guide employing air as dielectric of propagation.

In Figs. 1 and 1ª, 3 and 3ª, two methods of propagation of electric waves in a hollow dielectric tube 1 are shown. The electric lines of force are traced in continuous lines and the magnetic lines of force in dotted lines. In Figs. 1 and 1ª, the electric waves are so-called symmetrical waves or waves of the type $E_0$. All the components of the electric lines of force are radial and/or longitudinal and the magnetic lines of force are transverse circles centred on the axis.

In Figs. 3 and 3ᵃ, the electric waves are so-called asymmetrical waves of the type $E_1$. The components of the electric lines of force are in a plane containing the axis of the dielectric guide, or in parallel planes, and the magnetic components in transverse planes. In fact, these so-called asymmetrical waves have their components in the direction of propagation all approximately symmetrical with respect to a transverse plane containing the axis of the guide, but these components do not intersect.

Figs. 2 and 2ᵃ, and Figs. 4 and 4ᵃ show the inverse arrangements of Figs. 1 and 1ᵃ, and 3 and 3ᵃ respectively. The conventions of representation of electric and magnetic waves are the same as for the preceding figures. In Figs. 2 and 2ᵃ, the magnetic waves are of the so-called symmetrical type or the type $H_0$ and in Figs. 4 and 4ᵃ they are the so-called asymmetrical type $H_1$.

On all these figures the envelope of the dielectric guide is represented with an exaggerated thickness in order to show the passage of the lines of force in the said thickness, because at the ultra-high frequencies considered in the invention the lines of force in the dielectric are very close to the internal surface of the envelope; the lines of force passing in the dielectric represent currents of displacement, while the lines passing in the conducting envelope represent conduction currents.

As shown on the curves of Fig. 14 which represent the relations between the attenuation and the frequency, for example, in a guide whose envelope consists of a tube of copper of about 13 cm. diameter, there is a cut off frequency which depends upon the type of wave employed. For waves of the type $E_0$, $H_1$, there is a minimum attenuation for a certain frequency. The waves of the type $H_0$ have a very important peculiarity of being subject to an attenuation which always decreases when the frequency increases.

Figs. 1ᵇ, 2ᵇ, 3ᵇ and 4ᵇ represent examples of arrangements of electrodes placed at the end of the tubes of Figs. 1, 2, 3 and 4, so as to transmit or receive such waves. Figs. 1ᵇ and 3ᵇ show the arrangement of these electrodes in the case of electric waves having their components in the direction of conduction. Fig. 1ᵇ shows the electrode 2, which is connected to the grid of a wave generator, which is not shown, by means of conductor 4 and which is placed inside the circular electrode 1. The dimension of the electrode 2 serves to adapt the impedance of the coupling suitable for the transmission of the waves of the type $E_0$. Fig. 3ᵇ represents the two electrodes 1 and 2 placed inside the end of the guide tube through which passes the electric lines of force of the type $E_1$. These lines of force will be detached in closed lines and sent in the form of waves along the guide.

Figs. 2ᵇ and 4ᵇ represent the arrangements of electrodes in the case in which the magnetic waves have their components in the direction of propagation along the guide. Referring to Fig. 2ᵇ, 1 and 2 represent the two two conductors of a system of coaxial conductors placed in the guide (not shown) and connecting the wave source to a left hand conductor in the form of a figure-of-eight, and connected on the other hand at 3 to the central conductor 1 by its portion 6—7 and to the external conductor 2 by its portion 4—5. This conductor in the shape of a figure 8 remodels the waves arriving through the coaxial system and transmits them in the form of circles in the dielectric guide. Fig. 4ᵇ, represents a device for transmitting asymmetrical magnetic waves which comprises the coaxial system 1, 2 and plates 3 and 4 respectively connected to the conductors 1 and 2 extending inside the end of the guide tube 5. The magnetic waves are thus transmitted in suitable form in the dielectric guide.

Various forms and embodiments of tubes employed in practice for dielectric guides of ultra-high frequency waves have been considered in the prior art. A preferred form employing features of the present invention is shown in Fig. 18, which shows in longitudinal and transverse sections a guide whose construction is not expensive and which has flexibility and a high resistance. In this embodiment the air is employed as dielectric. A metal tube consisting of a sheet of lead or of load alloy 1 is reinforced by a helical steel spring 2. The inner surface of the lead tube can be covered with a fine layer 3 of copper, silver or any other conducting metal. This covering can either be applied by pulverisation at the time of the drawing of the tube or by suitable chemical means. This layer of high conductivity may also consist of a thin tube formed by a ribbon the edges of whose spirals are soldered together, or by bands assembled in a tube whose ends interlock, or by any other suitable device and on which the lead sheath is applied at the time of passing through the press.

When the tube has to have a high breakdown resistance, for example, when it has to be drawn through conduits, the reinforcement of the tube can be effected by steel wires parallel or substantially parallel to the axis of the tube. In the case in which the lead tube has to be mechanically protected a tube of ordinary lead may be employed externally reinforced by steel wires or ribbons as in the case of cables employed in the usual practice.

Referring now to Fig. 5, an embodiment of an amplifier employing secondary emission is shown in which G represents an electron gun schematically shown provided with a cathode $c$ and accelerator electrode $a$ and the usual batteries $E_p$, $E_c$ and $E_d$. The electron gun G releases electrons which pass in front of the wave input circuit I and through very small openings in a screen S and a parallel electrode 1. The secondary electrons produced by electrode 1 reach the electrode 2, which itself gives rise to a new emission of secondary electrons which reach the electrode 3. The secondary electrons produced by the electrode 3 are collected by the collecting electrode 5 through a screen grid 4 and thence pass into the output circuit O of the multiplier. The input circuit I may consist of parallel or concentric conductors connected to a segment of wire 6 parallel to the path of the electrons. When a current passes in this wire 6 it causes a deflection of the electrons of the beam and causes the quantity of electrons which reach the electrode 1 to vary. The flow of electrons reaching the collector 5 consequently varies according to the input current. In the case in which the input circuit I is composed of two parallel conductors no regulating means is necessary; but when the circuit I consists of a coaxial conductor system, various methods of adjustment may be employed, for example, the two wires connecting the conductors of the coaxial system or segment of wire parallel to the flow of electrons may be of adjustable length; or a telescopic adjustment may be provided at the end of the coaxial system.

In this figure as in the following figures the devices for control and secondary emission of the electrodes are shown schematically and it is clear that other embodiments may be conceived, for example, for Fig. 5 the control of the input may be different and may consist of electrostatic devices for causing electron deviation, for example, two plates enclosing the electronic pencil and brought to different potentials by their respective connections to the lead-in conductors of the input waves; or this electron pencil may be modulated in any manner employed in cathode ray tubes for television; in the same way, the output may be provided in different ways as will be shown later.

The devices producing the flow of electrons may also be provided in various ways. Such a device, for example, may consist of a device similar to those employed in cathode ray tubes. Or a cold electrode may be employed containing a radio-active substance or a metal point or any other method known in the art. In certain cases it is unnecessary to obtain a narrow bundle of electrons and a filament or an indirectly heated cathode may then be employed without any concentration device.

The amplifier shown in Fig. 5 may also be adapted to operate as an oscillator by coupling the output to the input by means of parallel or concentric conductors and by use of a resonance element which determines the frequency. This resonance element may, for example, consist of two parallel conductors as in certain oscillators for ultra-short waves.

A separate oscillator of a well known type can be coupled to such an electron multiplier device as shown in Fig. 6. In this figure an oscillator of the Barkhausen or Clavier type producing ultra-high frequencies is directly coupled to the secondary electron generator device in such a way that the electrons coming from the oscillator promptly reach the first electrode 1 of the multiplier tube. The frequency of the oscillator will be determined by the dimensions of the tube and in particular by the length of the electrode on which oscillations are produced.

An oscillator of the magnetron type can also be employed in such amplifiers. The coupling of an ultra-high frequency oscillator and a secondary emission device may also consist of an arrangement employing link conductors.

An amplifier of the type covered by the invention may be adapted to receive or transmit the waves in the dielectric guide device or directly in space, by employing in the output circuits the devices shown in Figs. 1b, 2b, 3b, 4b, or the like.

In another way, instead of transforming the waves into currents at the input, in order to control the operation of the amplifier and to effect the inverse transformation at the output, it is also possible to provide a direct control of the amplifier by the waves and produce the waves directly at the output of said amplifier. One example of such a device is shown in Figs. 7 and 7a, in which the amplifier is directly controlled at the input by incident waves of the type $E_0$ and $E_1$. The incident waves are reflected by the reflector R and the electron gun, which is shown schematically in the same manner as for Fig. 5, and connected to the guide by a copperplate seal 10, is placed in such a way that the electrons follow paths which are in part parallel to the electric lines of force. According to the direction and intensity of these lines of force, the bundle of electrons is more or less deflected and reaches the secondary emission device through an opening $r$ of the reflector R, consequently having a modulation which depends on the incident waves.

As a vacuum is necessary in the inside of the electron gun of the multiplier, it is well also to provide a vacuum from that part of the device to where the incident waves act on the electronic bundle. Otherwise the electrons would have such a high speed in order to keep their grouping during passage through the gaseous volume, that the deflection produced on the ingoing waves would be insufficient. A separator $s$ is provided between the dielectric guide 7 and the envelope device 8. This separator $s$ may be of glass or any other suitable dielectric substance, welded to the metal tubes 7 and 8 or clamped between them as shown at 9. In this way the electrons can be produced by the gun G at a relatively low speed which permits their deflection by the incoming waves.

In the case in which a very high sensitivity must not be obtained, the electrons can pass through Lenard windows and the separator $s$ is then eliminated because the vacuum is no longer necessary in that part of the apparatus traversed by the waves.

Figs. 8 and 8a represent a device in which two amplifiers similar to that of Fig. 7 are shown arranged to operate in the same envelope 8. The electron guns G and G' produce bundles which are both deflected by the incident waves reflected by the reflector R, and pass through the openings $r$ and $r'$. If these bundles are in phase, the two electron guns then work in parallel relation or if the phase relation between them is $\pi$ they work in push-pull.

Figs. 9 and 9a represent a device in which the amplifier is directly controlled at the input by incidental waves of the magnetic type $H_0$ and $H_1$. The ingoing waves are reflected by the reflector R and the electron gun G is placed, in this case also, in such a manner that the electrons follow a path substantially parallel to the electric lines of force. The electronic bundle is deflected and consequently modulated at the time of its passage through the openings $r$—$r$.

For such devices employing magnetic waves of the type $H_0$ and $H_1$, the arrangements may also be arranged in parallel or in push-pull as indicated in Fig. 10 which shows, in a single envelope, 8 the two electron gun devices G and G' working as described in connection with Fig. 8.

The devices considered above are only by way of example and other modifications may be employed in which the electron bundle produced by an electron gun is directly controlled by the ingoing waves.

Fig. 11 shows an example of a device in which waves of the symmetrical electric $E_0$ can be directly obtained from the last electrons produced by the multiplier device.

The electrons are produced in the example considered in the form of a conical surface. The conical surface of incident electrons is directed to the annular electrode 1 and, passing through a circular opening $r$ of the reflector R, reaches, after multiplication on the other annular electrodes 1, 2 and 3 the collector electrode 5 whose diameter is greater than that of the other electrodes. The conical electron surface is deflected by the ingoing waves. Moreover, in their passage from the electrode 3 to the collector 5, the movement of the electrons is partially radial and produces waves of the type $E_0$ towards the output O. The separator $s'$ of this output O may have the form of a concave lens so as to ensure a parallel bundle of waves.

In order to obtain asymmetrical waves of the type $E_1$, flattened electrodes may be arranged as shown in Fig. 3b.

In the case of symmetrical magnetic waves or those of the type $H_0$, an embodiment is shown Figs. 12 and 12a, in which the dielectric guide of the incoming waves is secured by a copper-glass seal 10 to the envelope 11 of the electron multiplying device. The electrons produced by the electron gun G pass through openings r—r of the reflector R and after having reached the electrode plates 1, 2 and 3 continue their path towards the collector 5. In this path from the electrode 3 to the collector 5 they are directed by a magnetic field H in accordance with a circular route. A high resistance electrode 12 is employed in order to direct the electrons in a suitable manner. The multiplier device is normally arranged with respect to the output dielectric guide 13 shown in Fig. 12a, so that the circles along which the electrons are displaced are in a plane perpendicular to the axis of this output guide 13. The waves of the type $H_0$ are thus directly generated.

It is clear that two multipliers of this type may be arranged so as to work together as shown schematically in Fig. 13. In this figure an amplifier $A_1$ displaces the electrons along a circle in one direction while another amplifier $A_2$ displaces them in the other direction. The planes of the circles along which the electrons are displaced are separated by a half wavelength $\lambda/2$ and the transmission is effected directly in one direction, for example in the direction D.

The electrons may be led along one portion only of a circumference, two amplifiers (or parts of amplifiers) or a larger number then work together in order to complete the circumference, in parallel planes or in the same plane.

In a similar manner asymmetrical waves of the type $H_1$ can be directly obtained by means of one or more amplifiers producing circular paths for the electrons so as to set up a magnetic field similar to that shown in Fig. 4.

When oscillators of a known type are coupled, as already indicated, to an electron multiplier device, it is possible to adapt such a unit so that the waves obtained react on the oscillator elements and reinforce the oscillations.

When waves of the type $E_0$ are introduced into an electron multiplier device comprising annular electrodes 1, 2, 3 as shown for example in Fig. 15, these waves may be employed to control the number of secondary electrons which reach the collecting electrode 5. A central electrode 4, consisting for example of a high resistance wire or an insulating cylinder covered with a thin conducting high resistance layer, is arranged axially with respect to the annular electrodes which are connected to the direct current supply $E_d$ so that the distribution of the potentials along this electrode 4 produces an inclined electrostatic field. A resistance R of such a value that it gives the desired effect may be employed. This inclined field represented on the drawings by its lines of force, tends to attract the electrons emitted by any one of the annular electrodes towards the other electrodes placed on the right of the first and towards the axial electrode 4. If a circular magnetic field be provided whose axis coincides with the axis of the electrode 4, the electrons will moreover be subjected to a force parallel to this axis. Consequently when this field has a direction directed towards the right, the force tending to attract the electrons towards the following electrons will be further increased.

Supposing that electrons are emitted by the electrode 1, the incoming waves will periodically cause the number of electrons reaching the electrode 2 to vary. In order to obtain a maximum efficiency the speed of the electrons should be approximately the same or even a fraction of that of the incoming waves. In this case, when the number of electrons which reach an electrode is maximum, the magnetic field will also be maximum and directed towards the right. For a given wavelength the potentials of the electrodes must have a given value.

The collecting electrode 5 of the electron multiplier may, if desired, be employed as a reflector in order to produce stationary waves. However, it will generally be more difficult to obtain a suitable operation in this case, electrons then being subjected to magnetic fields of alternatively opposite directions tending for one direction to bring them near the electrodes and for the other direction to separate them. However, if the electrodes are placed at a distance equal to one wavelength from each other and such that they are mainly subjected to the influence of the field in one direction, the magnetic field in the other direction being between the electrodes, it will then be possible to obtain a certain control of the electrons.

The electrode 5 may, if desired, be composed of a substance which absorbs the waves and avoids all reflection.

With regard to the details of construction of the devices described hereinbefore, the multipliers are not entirely suitable to work on very short waves, for example, on waves of the order of the centimetre. The electrons are displaced in effect between the electrodes at speeds very much less than that of light. For a potential of, for example, 200 volts, the speed of the electrons is about 0.03 times of light. For frequencies of 30,000 megacycles, the electrons being assembled in groups, the distance between successive groups is of the order of 0.3 mm. Moreover, the speed of two electrons emitted at the same moment is not necessarily the same (even neglecting the initial speed of emission) and these electrons do not follow the same path. When no special direction is taken, the electrons tend to abandon their initial grouping, which reduces the rate of modulation.

Consequently it will generally be necessary to employ known devices of electronic optics in order to obtain that the electrons as far as possible follow the same path, and that the bundle is suitably concentrated at a point of small surface or along a narrow circular line, according to whether the electrodes are flat or annular.

Such devices, comprising means to maintain the grouping of the electrons are represented on Figs. 16 and 17. Referring to Fig. 16, the electrode 1 is provided with a sharp branch 15 which emits electrons having a low initial speed. These electrons are attracted towards the electrode 2 by the electrostatic field existing between the electrodes 1 and 2. The presence of the diaphragm $D_1$ directs all of the electrons along almost identical paths. With a suitable choice of dimensions of the said diaphragm $D_1$, and suitable spacing with respect to the electrodes, the electrons will reach the electrode 2 over a well defined constant length circular path. All the electrons then have about the same speed, and the electrons emitted by the electrode 1 at a given moment will reach the electrode 2 together. Another diaphragm $D_2$ is, in the same way, provided between the electrode 2 and the following electrode which is not shown. Fig. 17 shows a device having a diaphragm D provided with an annular opening instead of with a central aperture, and behaving in a similar manner to the device shown in Fig. 16.

Similar results can be obtained by suitable devices in the case of flat electrodes. In the same way, other known devices may be employed in order to concentrate the electrons by magnetic or electrostatic means.

In the case of devices with secondary emission, of the types shown in Figs. 11, 12 and 13, producing a direct radiation from the electrons, the electrons are also collected in groups succeeding each other at distances equal to a fraction of a millimetre only, when the wavelengths under consideration are of the order of the centimetre and low potentials only, are employed.

In order to increase the radiation, it would be desirable to make the difference of potential between the last multiplying electrode 3 and the collecting anode 5, as high as possible so as to obtain a higher speed of electrons from the electrode. The direction of displacement of the electrons has an influence on the direction and intensity of the radiation.

The phenomenon of radiation is complicated by the fact that the electrons do not have a constant speed. Their acceleration is approximately constant during their journey in the free space and changes value when they reach the collector.

The path followed should have a predetermined form so as to obtain a maximum radiation in a certain direction. For example, it is possible to neutralise the radiation emitted by the electrons during a portion of their journey by the radiation emitted during another portion of this journey. In the case of Fig. 11 for example, the waves must be mainly emitted by the vertical portion of the path followed by the electrons.

Generally the speed of the electrons will be less than that of the waves generated and suitable arrangements must be provided for this purpose. The devices shown by Figs. 12 and 13, for example, generate waves of helicoidal form rather than waves of the actual type $H_0$. This may be considered as an approximation of the desired wave form and accordingly may be used. However, the preferable arrangement would be, for example, to employ several pairs of electrodes arranged along a circumference in such a way that groups of electrons which are simultaneously displaced from the odd electrodes towards the even electrodes, follow paths which together form a complete circle. The secondary emission device might then consist of a certain number of multiplying electrodes of annular shape followed by an electrode composed of a certain number of plates placed along the circumference and of a collecting electrode similarly situated and parallel with the preceding electrode. The electrons will then follow short paths in spiral arcs between the metallic plates of the two last electrodes. A radial magnetic field would be provided to facilitate this latter operation.

Fig. 14, already mentioned, shows curves in which the attenuation in decibels per thousand at a distance of 1610 metres is shown in ordinates and the frequency in megacycles per second, in abscissae. The curve D for the various types of waves considered in the invention is traced for a dielectric guide having diameters ranging from 20 cm. to 35 cm. and the curves indicated by D' are traced for the various types of waves using guides of from 12 cm. to approximately 70 cm. In accordance with these curves it is clear that the waves of the type $H_0$ or symmetrical magnetic waves are particularly interesting with regard to attenuation. These waves, however, have the disadvantage that for a given diameter of the guide, they must be shorter than waves of the types $E_0$ or $HI$. As, however, the devices described above permit the production of waves of relatively high power for a wavelength of the order of a centimeter, the waves of the type $H_0$ may be employed with guides of relatively small diameter and the attenuation will then also be low. For repeaters placed at a distance of about 16 kilometres and for attenuation of about 100 decibels per section between repeaters, one would have tubular guides from 4 to 5 cm. in diameter. It is possible without perceptible disadvantages to employ very low transmission levels, since the secondary emission devices practically do not produce parasitic noises and interference phenomena are eliminated. The noise due to thermic agitation, for example, may practically be suppressed.

Waves of one of the types considered may be devices known in the art, be transformed into waves of another type. For example, if waves of the type $H_0$ are preferably employed in the transmission and it is simple to obtain first waves of the type $E_0$, devices for wave conversion may be employed.

A single dielectric guide is sufficient to transmit simultaneously in both direction on condition by providing at the ends of the guide devices avoiding any harmful interference between the waves transmitted, for example devices for polarising the waves in different directions or for giving them suitable different frequencies. In practice it is perferable to provide two identical separate guides in order to be able to use one of them as a reserve in order to prevent a total interruption in the service. These guides may be placed either in the same section or in different sections. The amplifier devices may be arranged so as to take up little space and to have a relatively long life, and may consequently be placed on a pole or in a buried box. The current necessary to feed the amplifiers may be supplied by conductors covered with lead placed along the dielectric guide. In the cases in which the amplifier does not comprise a heated cathode, a single direct current of high tension is used and the amount of energy required will be small.

Such devices may be employed in long distance telephone and telegraph installations as well as in the transmission of images and of television.

It is clear that the devices described above have been described by way of example, and that other embodiments employing features of the invention may be conceived.

In the preceding description the term electron multiplier must be understood as relating to any devices employing secondary emission and not to a particular device of this type.

What is claimed is:

1. In a dielectric guide system, a dielectric guide comprising a lead tube and a thin layer of good conducting material on the inner surface of said lead tube, a device for generating waves of ultra-high frequency, an electron multiplier coupled thereto, and means for associating the output of said electron multiplier with said dielectric guide to directly impress waves on said dielectric guide.

2. In a dielectric guide transmission system, a dielectric guide, a source of primary electrons, a series of secondary electron emitting electrodes arranged as an electron multiplier to produce an output electron stream, means for controlling the number of said primary electrons which impinge upon the first of said series of electrodes, and means for coupling the output of said electron multiplier with said dielectric guide to produce waves in said dielectric guide directly by action of said output electron stream.

3. In a dielectric guide transmission system, a dielectric guide, a source of primary electrons for producing a primary electron stream, a series of secondary electron emitting electrodes arranged as an electron multiplier, means for coupling said guide to said electron multiplier, and means for directly applying waves received along said guide to said primary electron stream for varying the number of primary electrons which impinge upon the first of said series of electrodes.

4. In a dielectric guide transmission system, means for producing a beam of primary electrons, a series of secondary electron emitting electrodes arranged as an electron multiplier, means for directing said beam upon the first of said electrodes, and means for directly applying waves in said dielectric guide to said beam for modulating said beam of primary electrons.

5. In a dielectric guide transmission system, a dielectric guide, a device for generating waves of ultra-high frequency, an electron multiplier coupled thereto for producing an output electrode stream and means for coupling the output of said electron multiplier with said dielectric guide to directly impress said output electron stream on said guide.

6. In a dielectric guide transmission system, a dielectric guide, means for producing a beam of primary electrons, and electron multiplier, means for directing said beam upon said electron multiplier, and means for directly applying waves in said dielectric guide to said beam for causing waves received over said guide to influence directly said beam of primary electrons.

7. In a dielectric guide system, a dielectric guide, a source of primary electrons, a series of secondary electron emitting electrodes arranged as an electron multiplier within the guide, a collector electrode within said guide, means for controlling the number of primary electrons impinging upon said electron multiplier, and means for controlling the path of the electrons passing to said collector electrode, said secondary electron emitting electrodes and said collector electrode being of annular shape and disposed in cascade formation whereby the movement of the electrons has a radial component thereby causing the propagation of symmetrical electric type waves along said guide.

8. In a dielectric guide system a dielectric guide, means for producing two beams of primary electrons, two electron multipliers, a source of input waves, means for causing said input waves to directly modulate simultaneously said beams of primary electrons, and means for causing said electron multipliers to work in parallel or push-pull relation to directly impress waves of a desired characteristic on said guide.

STANISLAS VAN MIERLO.